United States Patent [19]

Poll

[11] 4,298,360
[45] Nov. 3, 1981

[54] PULSED AIR FILTER CLEANING SYSTEM

[76] Inventor: Leif W. Poll, 7 Dalewood Rd., W. Caldwell, N.J. 07006

[21] Appl. No.: 230,650

[22] Filed: Feb. 2, 1981

[51] Int. Cl.$^3$ ............................................. B01D 46/04
[52] U.S. Cl. ...................................... 55/273; 55/302; 55/379
[58] Field of Search .................. 55/272, 96, 273, 302, 55/378, 379; 210/333.01, 333.1

[56] References Cited

U.S. PATENT DOCUMENTS 3,095,289 6/1963 Egan ........................................ 55/96

FOREIGN PATENT DOCUMENTS 2430137 1/1980 France ................................ 55/302

Primary Examiner—Bernard Nozick
Attorney, Agent, or Firm—Weingram & Klauber

[57] ABSTRACT

A system for cleaning dust collecting filter bags with pulsed air includes a plurality of rectangular channels positioned below a tube sheet supporting rows of filters. A short length of pipe connects the channels through the tube sheet to the top of a venturi within the open end of each filter bag. A source of compressed air periodically supplies pulses of air through the channels and openings in the pipes to force air through the center of the venturis and bags in a reverse direction to clean the filters. The channels are preferably positioned between pairs of filters to clean two rows at the same time for greater efficiency, while providing permanent added structural support for the tube sheet.

10 Claims, 6 Drawing Figures

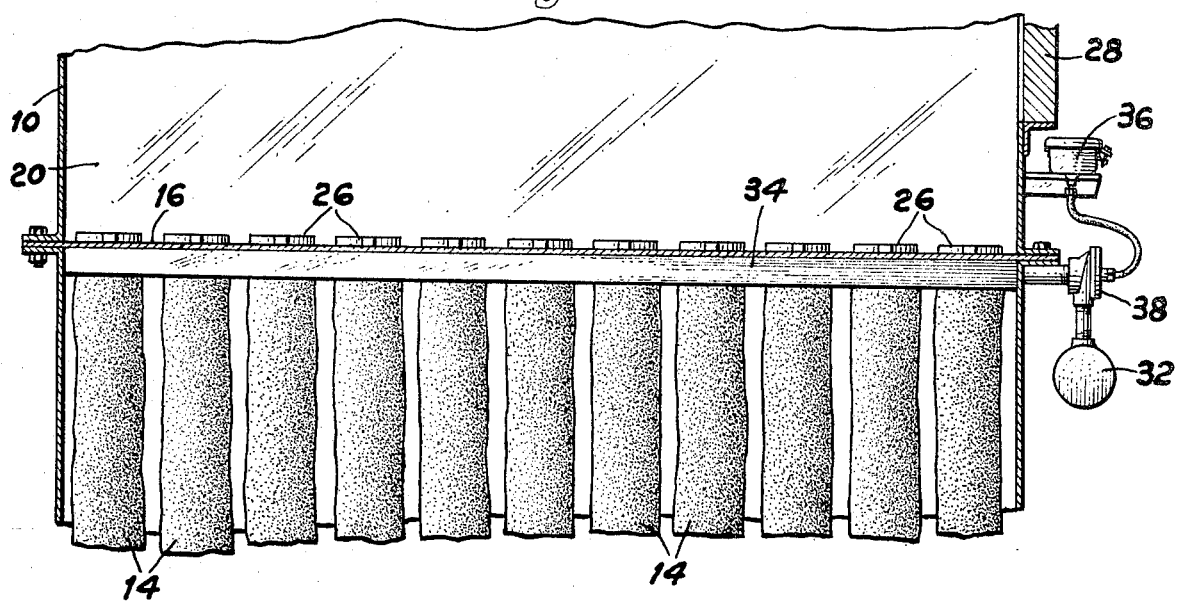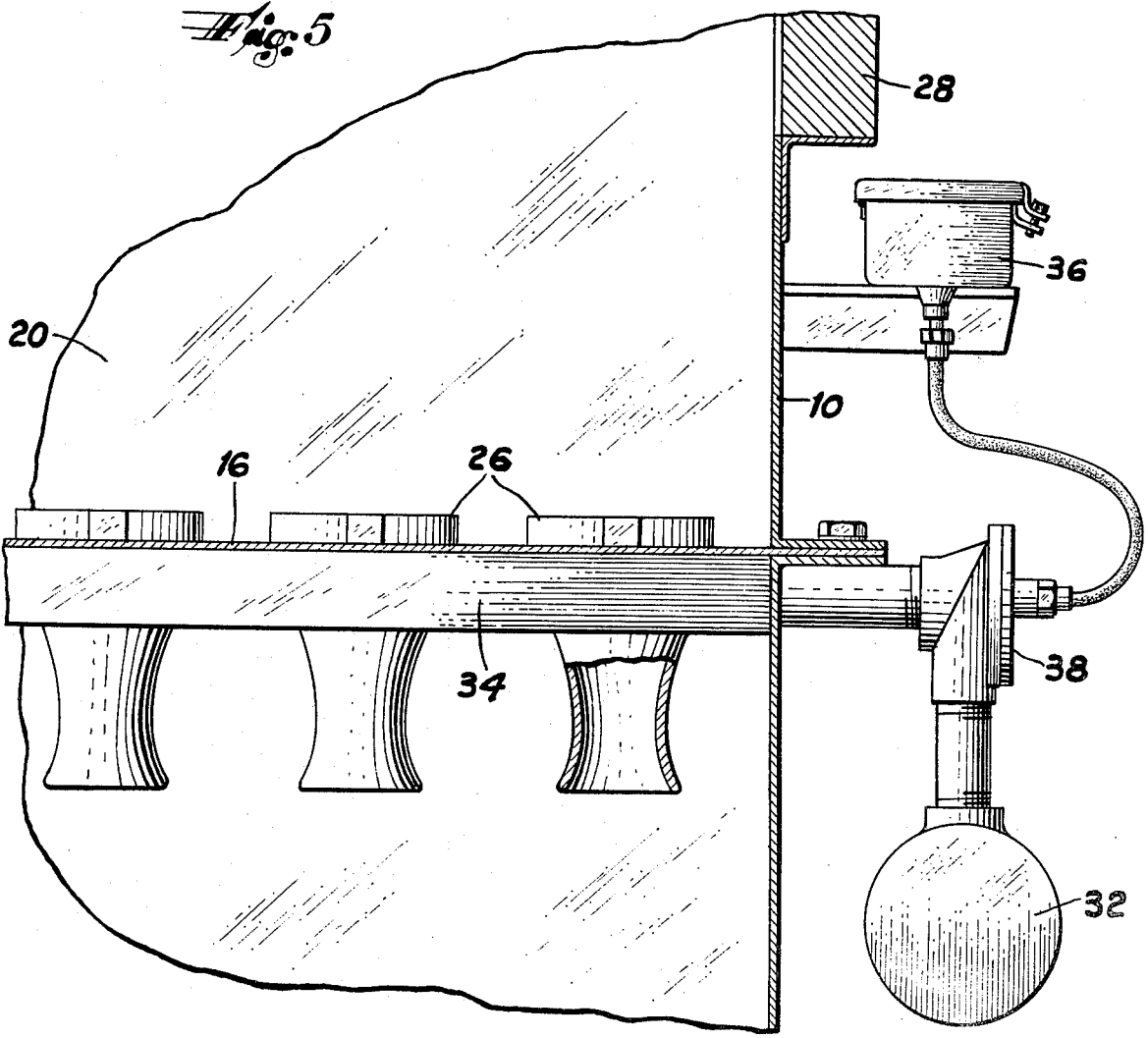

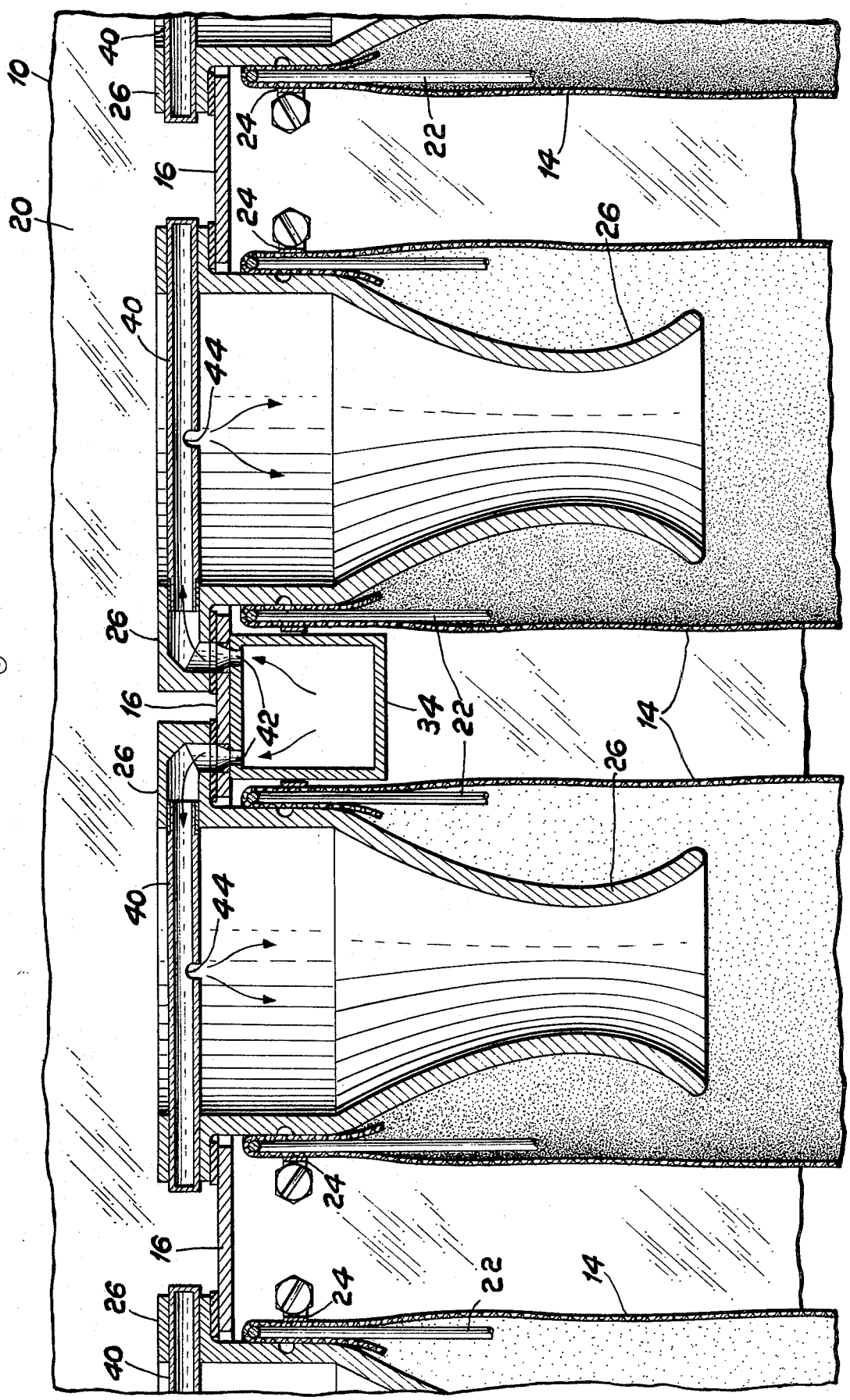

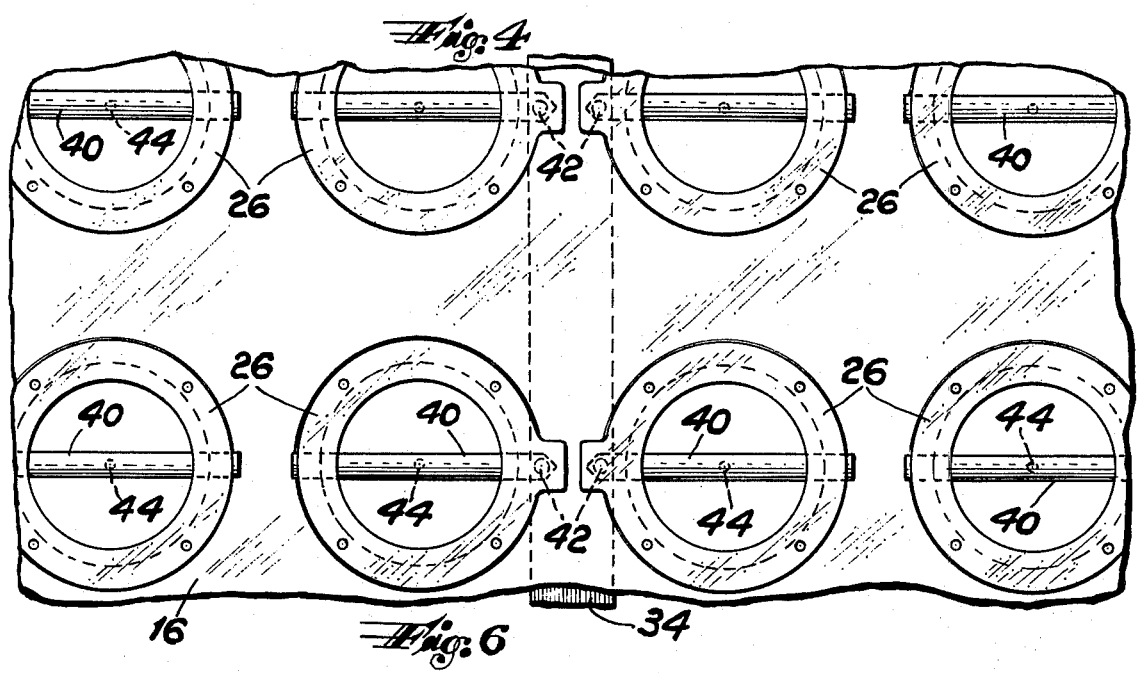
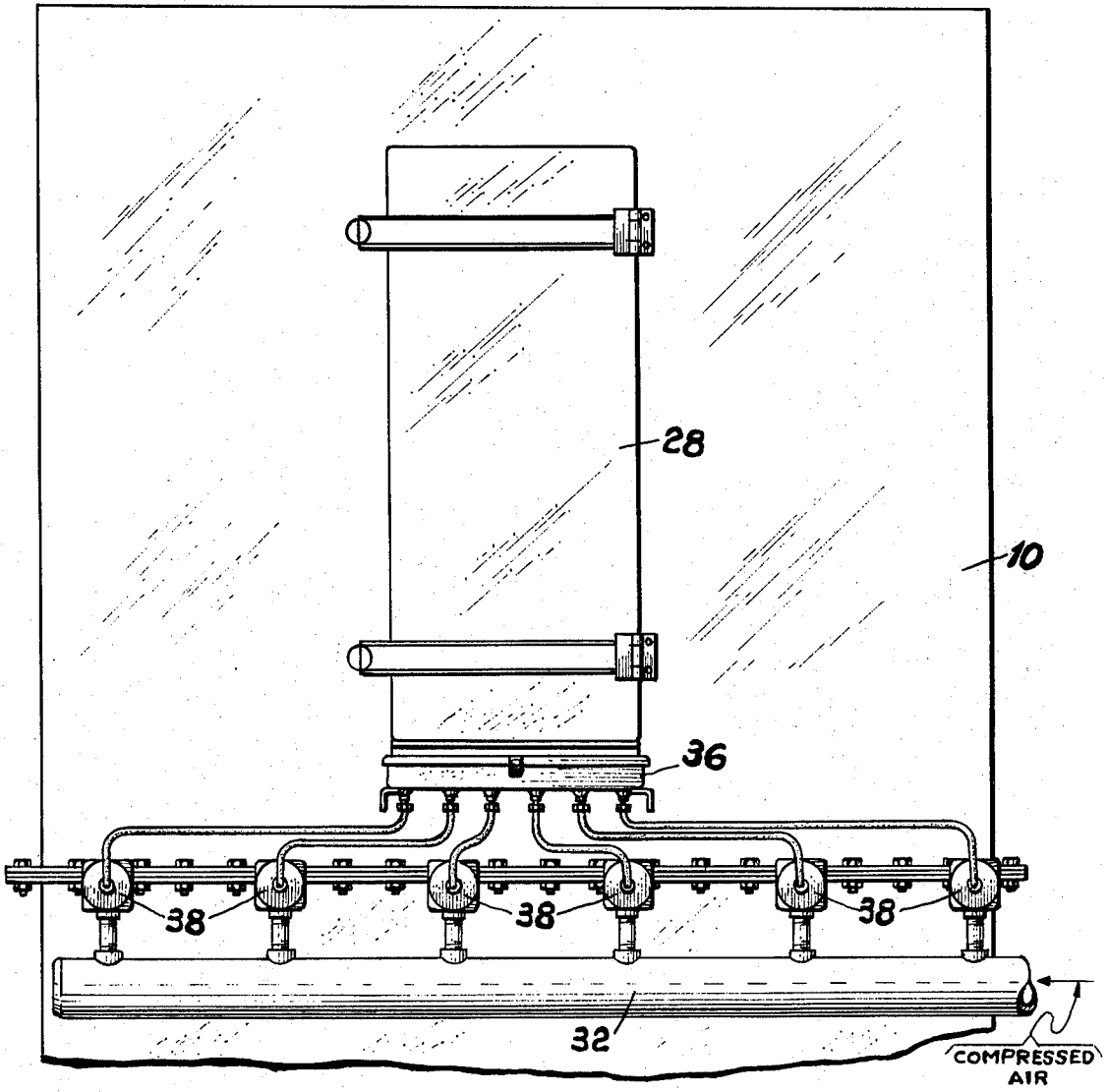

PULSED AIR FILTER CLEANING SYSTEM

BACKGROUND OF THE INVENTION

1. Field of the Invention

The present invention relates to a system for filtering dust particles from air and particularly to an improved system employing pulsed air in a reverse direction for more efficient cleaning of filter bags.

2. Description of the Prior Art

Present air filtering systems utilize a plurality of elongated filter bags supported vertically from a tube sheet within an enclosed housing. Dust-laden air is normally drawn into the lower housing and passed through the filters with clean air being exhausted from the open ends at the top. Removal of the dust collected on the outer surface of the filters is accomplished by periodically supplying pulses of compressed air through vertical pipes or horizontal blow tubes having holes spaced over the bag openings. The air is forced in a reverse direction through venturis in the open ends to dislodge the dirt on the outer surface of the bags. The dirt is then collected in hoppers at the bottom of the housing for mechanical removal. Selected groups of bags are cleaned together in a controlled sequence to permit continued operation. Examples of such known systems are found in U.S. Pat. No. 4,174,204, issued Nov. 13, 1979, and No. 3,963,467, issued June 15, 1976.

These systems generally have several disadvantages including the attraction of dust and dirt by bags adjacent to those being cleaned, frequent misalignment of blow tubes and pipes over the venturi openings of the bags due to bending or movement during installation, inspection, or repairs, and the need for removal of elements in order to permit bag replacement. Additional structural connections are also required for the tubes to minimize vibration caused by blasts of compressed air.

SUMMARY OF THE INVENTION

It is therefore the primary object of the invention to provide a more efficient system for supplying pulses of compressed air for cleaning dust collecting filter bags.

It is a further object of the invention to provide a simplified structure for a pulsed air filter cleaning system which eliminates much of the overhead tubes and pipes supplying the compressed air.

Another object of the invention is to provide a more permanent strengthened and precisely aligned structure for supplying pulsed air for cleaning filters.

These objects are achieved with a novel arrangement of a plurality of rectangular channels positioned below the tube sheet between adjacent rows of filter bags. The channels are connected by short lengths of pipe over the tube sheet to a venturi in the open end of each filter bag. The channels are permanently secured to and provide support for the tube sheet without added couplings or other reinforcing structure. The short lengths of pipe provide accurate stable alignment of openings for compressed air over the center of the venturis and bags for optimum distribution of reverse air pulses for cleaning the bags. One channel can supply air pulses to two adjacent rows of filters to eliminate one-half the previously required number of blow tubes, reduce the amount of dust deposited on other bags, and simplify the installation and replacement procedure. Other objects and advantages will become apparent from the following description in conjunction with the accompanying drawings.

BRIEF DESCRIPTION OF THE DRAWINGS

FIG. 2 is a partial cross-sectional side view of the filter cleaning system of the present invention;

FIG. 3 is an enlarged cross-sectional end view of a portion of the pulsed air channel and filter support arrangement of the present invention;

FIG. 4 is a top view of the channel and filter arrangement of FIG. 3;

FIG. 5 is an enlarged view of a portion of the filter cleaning system of FIG. 2 showing the pulsed air control arrangement; and FIG. 6 is a front view of the pulsed air control arrangement.

DESCRIPTION OF THE PREFERRED EMBODIMENT

Figure 1:
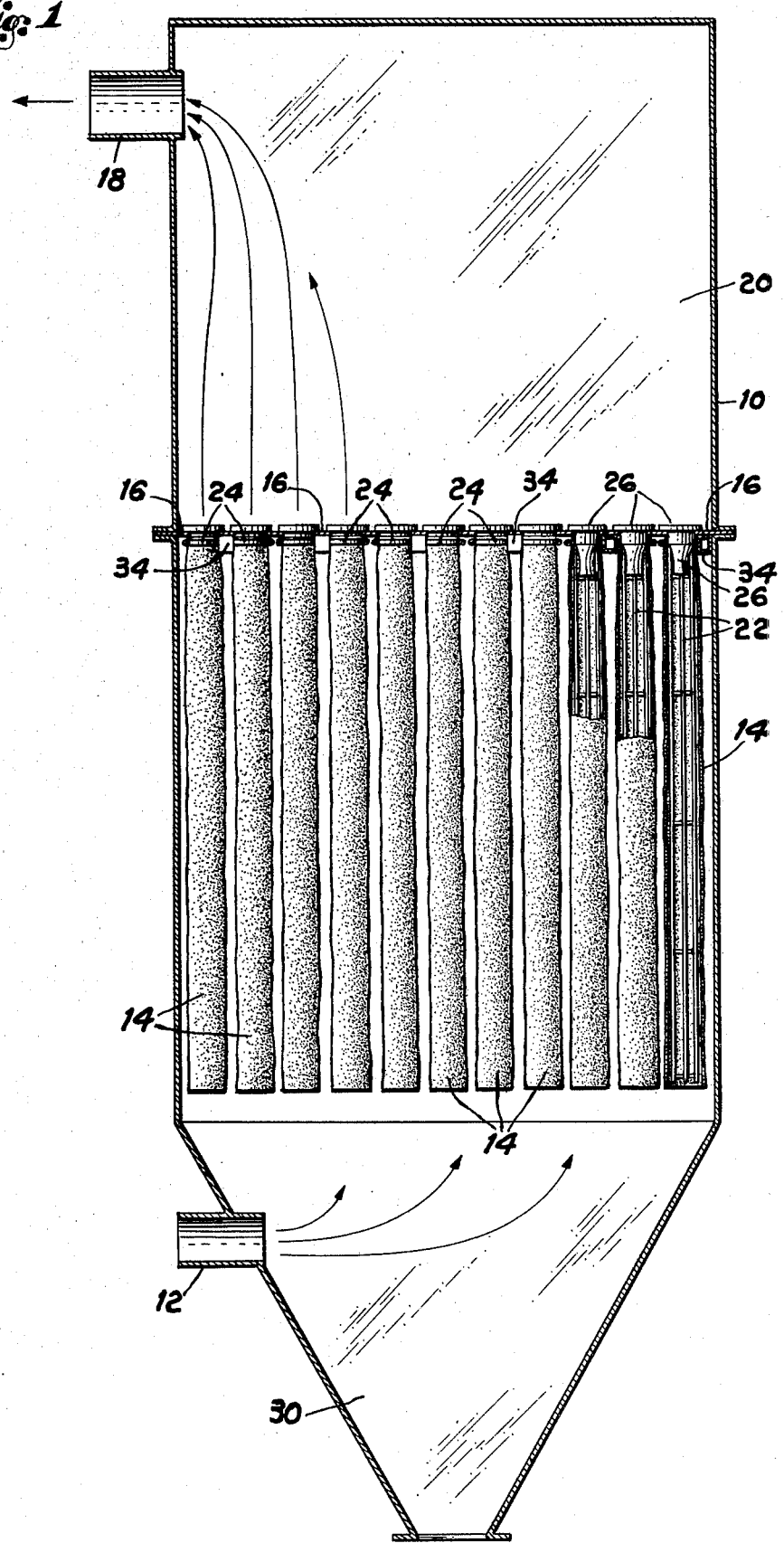
FIG. 1 is a front view in partial cross-section of a dust collecting filter cleaning system employing the novel pulsed air channel arrangement of the present invention.

As shown in FIG. 1, a dust collecting system includes a housing 10 having an inlet 12 for dust-laden air in a lower chamber, a plurality of filter bags 14 hanging vertically and clamped securely to a horizontal platform or tube sheet 16, and an exhaust outlet 18 for filtered air passing from the open ends of the filter bags through an upper chamber or plenum 20. Dust particles are collected on the outer surfaces of the bags as air passes under a slight pressure through the bags into the center and up through the open ends. A suitable exhaust means, such as a fan, provides continuous circulation of air through the system.

The housing is dust-tight with the filter bags fitted over wire retainers 22 and secured by clamps 24 to venturis 26 attached to the tube sheet. The tube sheet contains openings for the filter bags and seals the bag compartment from the upper chamber. A door or passageway 28 provides access to the upper chamber for removal and installation of bags. The lower chamber includes a hopper 30 for collection of solid dust accumulations removed from the filter bags by reverse pulses of compressed air in a cleaning process to be more fully described hereinafter. Dust and dirt are funneled through the hopper to a suitable mechanical removal apparatus.

As shown in FIGS. 2, 3, and 4, in order to clean the bags, a source of compressed air 32, of about 100 psig, is periodically and selectively applied in short pulses in a reverse direction through a unique arrangement of blow tubes 34. The compressed air is controlled by solenoid and diaphragm valves 36, 38 to direct the pulses of high pressure air through a plurality of blow tubes 34, preferably in the form of rectangular channels, positioned below and welded to the tube sheet 16. The channels are located between two adjacent rows of filter bags and each channel is connected to pairs of adjacent bags through short lengths of pipes 40. Sealed passages 42 on each side of each channel connect to the pipes through the tube sheet and flanges of the venturis 26. The pipes 40 extend over the tube sheet and across each venturi and bag opening. An orifice or hole 44 in each pipe is aligned with the center of each venturi and bag to direct the pulses of compressed air in the reverse direction through the bags in a precise and evenly distributed manner to dislodge the accumulations of dust on the outer surfaces of the filters. Where desired or where required by design limitations, the blow tube channels may be connected to only one row of filter bags and may have passages on one side for directing air over that one row.

As shown in FIGS. 5 and 6, a plurality of solenoid valves 36 in a control unit are connected to diaphragm valves 38 to periodically operate selective rows of blow tubes and clean associated filter bags in a predetermined pattern. A remotely mounted timing mechanism or microprocessor of a commercially available type, not shown, controls the sequence of operation of the air valves by actuating normally closed solenoid valves. Opening the solenoid valve causes momentary actuation of the associate diaphragm valve to let air into the blow tube. The timing mechanism includes controls to adjust the length of time between valves being energized, or pulse frequency, and the length of time that the valve remains energized, or pulse duration.

The permanent positioning of the blow tubes under the tube sheet in the present arrangement eliminates any need for movement or removal of tubes during replacement of filter bags and provides a reinforced simplified structure. Bags are more easily replaced by grasping the small lengths of pipe over the tube sheet and lifting the venturi and bag assembly. Realignment of the discharge opening of the pipe over the venturi and new bag is inherent in the design. By utilizing one blow tube with two adjacent rows of bags, half the usual number of blow tubes are eliminated in addition to half the number of solenoid and diaphragm valves with the associated piping and connections. There is also a reduction in the amount of dislodged dust re-entrained in the air and deposited on adjacent bags, since the nearest bags are further away from the immediate two rows being cleaned. This, along with the precise alignment of elements, improves the efficiency of dust collection.

The present invention thus provides a more efficient, simplified, less costly and sturdier structure for a dust collecting and filter cleaning system. While only a single embodiment has been illustrated and described, it is apparent that many variations may be made in the particular design and configuration without departing from the scope of the invention as set forth in the appended claims.

I claim:

1. An air cleaning system comprising:
   a housing including an inlet for receiving dust-laden air and an exhaust chamber having an outlet for exhausting clean air;
   a filter chamber including a plurality of filter bags positioned between said inlet and outlet for cleaning said air;
   a platform extending across said housing and separating said filter chamber and inlet from said exhaust chamber and outlet, said platform including a plurality of openings holding and sealing said filter bags, said bags having open ends communicating with said exhaust chamber through said platform openings; and
   means for cleaning said filter bags including a tubular channel secured below said platform adjacent said filter bags,
   a plurality of conduits extending over the open ends of said filter bags, each said conduit having an orifice facing respective said open ends of said filter bags, a plurality of passages connected through said tubular channel and platform to respective said conduits,
   a source of compressed air connected to said tubular channel,
   control means for periodically applying pulses of said compressed air through said tubular channel and passages and through said conduits and orifices to direct said air pulses in a reverse direction into said filter bag open ends to remove dust from the outer surfaces of said bags, and
   means for collecting said dust removed from said bags.

2. The system of claim 1, wherein said filter bags are arranged in a plurality of rows, said tubular channel being positioned between two adjacent rows and including said passages connected through opposite sides of said channel and through said platform to respective said conduits over the open ends of said filter bags in said two adjacent rows.

3. The system of claim 2, wherein a plurality of tubular channels are respectively positioned between alternate adjacent rows of said filter bags.

4. The system of claim 3, wherein said control means for periodically applying pulses of compressed air include means for operating selective tubular channels for cleaning selective rows of filter bags.

5. The system of claim 4, wherein said control means for periodically applying pulses of compressed air includes timing means for varying the pulse frequency and duration.

6. The system of claim 4, wherein said control means includes solenoid valves and diaphragm valves.

7. The system of claim 3, wherein said tubular channels are rectangular and are welded to and support said platform.

8. The system of claim 1, wherein said filter bags include venturis secured in said open ends, said conduit orifices being aligned over the center of respective venturis and open ends.

9. The system of claim 8, wherein said venturis include flanges mounted on said platform and said passages connect through said flanges to said conduits.

10. The system of claim 9 wherein respective said filter bags, venturis and conduits are removable as a unitary assembly.

* * * * *